(12) United States Patent
Liu

(10) Patent No.: US 11,728,716 B2
(45) Date of Patent: Aug. 15, 2023

(54) STATOR ASSEMBLY AND CENTER DISK SPINDLE DOUBLE-ROTOR MOTOR

(71) Applicant: Jian Liu, Hengyang (CN)

(72) Inventor: Jian Liu, Hengyang (CN)

( * ) Notice: Subject to any disclaimer, the term of this patent is extended or adjusted under 35 U.S.C. 154(b) by 12 days.

(21) Appl. No.: 17/360,561

(22) Filed: Jun. 28, 2021

(65) Prior Publication Data

US 2022/0320980 A1  Oct. 6, 2022

(30) Foreign Application Priority Data

Apr. 2, 2021 (CN) .......................... 202110360973.6

(51) Int. Cl.
| | |
|---|---|
| *H02K 16/02* | (2006.01) |
| *H02K 5/20* | (2006.01) |
| *H02K 1/02* | (2006.01) |
| *H02K 1/16* | (2006.01) |
| *H02K 3/02* | (2006.01) |
| *H02K 5/02* | (2006.01) |
| *H02K 7/00* | (2006.01) |

(52) U.S. Cl.
CPC ............. *H02K 16/02* (2013.01); *H02K 1/02* (2013.01); *H02K 1/165* (2013.01); *H02K 3/02* (2013.01); *H02K 5/02* (2013.01); *H02K 5/207* (2021.01); *H02K 7/003* (2013.01)

(58) Field of Classification Search
CPC ................................ H02K 16/02; H02K 1/165
See application file for complete search history.

(56) References Cited

U.S. PATENT DOCUMENTS

| | | | | |
|---|---|---|---|---|
| 7,315,101 B2* | 1/2008 | Shimada | ................. | H02K 9/06 310/90.5 |
| 7,531,937 B2* | 5/2009 | Kojima | ................. | H02K 1/182 310/216.096 |
| 8,058,762 B2* | 11/2011 | Asano | ................. | H02K 1/2793 310/156.33 |
| 8,497,612 B2* | 7/2013 | Minowa | ................. | F03D 9/25 290/55 |
| 10,630,157 B2* | 4/2020 | McCaw | ................. | H02K 21/24 |
| 2013/0119816 A1* | 5/2013 | Yang | ................. | H02K 1/24 310/216.007 |

* cited by examiner

*Primary Examiner* — Dang D Le
(74) *Attorney, Agent, or Firm* — Bay State IP, LLC

(57) ABSTRACT

A stator assembly and a center disk spindle double-rotor motor, includes a stator carrier and a winding core body; a through slot is formed in an end surface of the stator carrier in a penetrating manner; and the winding core body is arranged in the through slot. The center disk spindle double-rotor motor includes a transmission shaft, a stator assembly and rotor assemblies; the stator assembly is arranged on the transmission shaft; the transmission shaft can rotate relative to the stator assembly; the transmission shaft is fixedly provided with the rotor assemblies on two sides of the stator assembly. The whole center disk spindle double-rotor motor uses a double-rotor structure; and by means of the stator assembly of a specific structure, and in combination with the rotor assembly, the motor has beneficial effects of high efficiency, high power, large torque, low loss, light mass, good heat dissipation and the like.

8 Claims, 5 Drawing Sheets

STATOR ASSEMBLY AND CENTER DISK SPINDLE DOUBLE-ROTOR MOTOR

CROSS REFERENCE TO RELATED APPLICATION

This application claims the benefit of and takes priority from Chinese Patent Application No. 202110360973.6 filed on Apr. 2, 2021, the contents of which are herein incorporated by reference.

TECHNICAL FIELD

The present disclosure relates to the technical field of motors and motor components, and specifically relates to a stator assembly and a center disk spindle double-rotor motor.

BACKGROUND

Motors are widely applied. Some popular application fields, special industries and the rapid development of the new energy market in recent years have placed higher and higher technical requirements for motors. Small size, light weight, high efficiency, high power, high load, good heat dissipation, and low loss are prerequisites for the future development of motors.

Since they are invented, motors have evolved into multiple functions, structures and shapes, but they all have only one mechanical port. In order to make better use of the motor space and increase the motor power, some people have proposed the concept of a dual-rotor motor in recent years, but it is only the integration of traditional motor technology and is constructed as a dual-rotor motor with two mechanical ports. Different functional structures often have many problems such as complex manufacturing process and control, low energy efficiency ratio, poor heat dissipation, etc., so that the motors have not been applied.

SUMMARY

One of the purposes of the present disclosure provides a stator assembly, so as to solve the technical problem that an existing motor using a traditional stator is lower in efficiency in existing technology. Many technical effects (a winding core body includes a stator core and a winding group; the stator core matches a through slot; the stator core has no spatial restriction to the winding group, so that a winding wire can be better selected, the overall space can be better used, and the motor structure is more compact; the stator core uses an oriented silicon steel sheet that has lower iron loss and higher magnetic conductivity and magnetic saturation; the winding group is a copper foil winding; a copper foil has lower resistance and no high-frequency skin effect, and has better thermal conductivity through higher current, so that the motor temperature rise is lower, the motor efficiency, the rotating speed, and the heat dissipation effect are effectively improved; a first mounting hole is provided with a bearing shell; the bearing shell is provided with a bearing; relative rotation between the bearing shell and a motor transmission shaft can be realized; furthermore, driving control is simple, and firm mounting is realized) achieved by preferred technical solutions in many technical solutions provided by the present disclosure refer to the following details.

In order to achieve the forgoing purpose, the present disclosure provides the following technical solution.

A stator assembly provided by the present disclosure includes a stator carrier and a winding core body. The stator carrier is provided with a first mounting hole and is used for being mounted on a transmission shaft; a through slot is formed in an end surface of the stator carrier in an axially penetrating manner; and the winding core body is arranged in the through slot.

Preferably, the winding core body includes a stator core and a winding group; the stator core matches the through slot; and the winding group is wound on the stator core.

Preferably, the stator carrier is formed by stacking non-oriented silicon steel sheets, and the stator core is formed by stacking oriented silicon steel sheets.

Preferably, the winding group is a copper coil winding, and the copper coil winding is wound on the stator core.

Preferably, the stator carrier includes a bearing shell; the bearing shell is arranged at the first mounting hole; and a bearing is mounted in the bearing shell.

The stator assembly provided by the present disclosure at least has the following beneficial effects:

the stator assembly includes the stator carrier and the winding core body; the stator carrier is used for mounting the winding core body; the winding core body cooperates with the stator carrier to fix the core body and enhance an inductive magnetic field.

The stator carrier is provided with the first mounting hole and can be mounted on a motor transmission shaft.

The through slot is formed in the end surface of the stator carrier in the axial penetrating manner, and the winding core body is arranged in the through slot, so that the single winding core body has two mechanical ports and can achieve effects of preventing magnetic flux leakage and concentrating magnetic lines; the inductive magnetic force is effectively enhanced; the thickness of the stator of the motor is reduced; a driving system is simplified; and meanwhile, the winding core body is completely arranged in the through slot, so that non-work copper loss is avoided, and the motor efficiency is further improved.

A shell is made of an aviation aluminum material that is good in intensity, good in corrosion resistance and good in machinability; a magnetic plate is an iron plate that is outstanding in magnetic flux leakage prevention and magnetic line concentration effect; a permanent magnet is a neodymium magnet that has extremely high magnetic energy product and coercive force, is high in cost performance, and has good mechanical properties; the shell is provided with an air guide chute, and the magnetic plate is provided with a ventilation slot, so that the heat dissipation effect is outstanding Another purpose of the present disclosure is to provide a center disk spindle double-rotor motor to solve the technical problem that an existing motor in the existing technology is relatively poor in usage effect. Many technical effects (the center disk spindle double-rotor motor includes a heat dissipation assembly; the heat dissipation assembly includes a heat conduction pipe and a heat dissipation sheet; liquid cooling and air cooling are used to further enhance the heat dissipation effect of the motor; a rotor assembly includes a shell, a magnetic plate, and a permanent magnet; the magnetic plate and the permanent magnet are sequentially arranged on the inner side of the shell; the permanent magnet rotor cooperates with the stator assembly to generate a rotating magnetic field in an air gap; the magnetic plate is used for a magnetic loop of the permanent magnet and can play a role in preventing magnetic flux leakage and concentrating magnetic lines, thus effectively enhancing the magnetic intensity of the permanent magnet; the shell is made of an aviation aluminum material that is good in intensity, good in corrosion resistance and good in machinability; the magnetic plate is an iron plate that is outstanding in magnetic flux leakage prevention and magnetic line concentration effect; the permanent magnet is a neodymium magnet that has extremely high magnetic energy product and coercive force, is high in cost performance, and has good mechanical properties; the shell is provided with an air guide chute, and the magnetic plate is provided with a ventilation slot, so that the heat dissipation effect is outstanding, etc.) achieved by preferred technical solutions in many technical solutions provided by the present disclosure refer to the following details.

In order to achieve the forgoing purpose, the present disclosure provides the following technical solution.

A center disk spindle double-rotor motor includes a transmission shaft, the stator assembly and the rotor assemblies. The stator assembly is arranged on the transmission shaft; the transmission shaft can rotate relative to the stator assembly; the transmission shaft is provided with the rotor assemblies on two sides of the stator assembly; and the rotor assemblies and the transmission shaft synchronously rotate.

Preferably, the center disk spindle double-rotor motor includes a heat dissipation assembly; the heat dissipation assembly includes a heat conduction pipe and a plurality of heat dissipation sheets; the heat conduction pipe is annularly arranged on the stator assembly; and all the heat dissipation sheets are circumferentially disposed relative to the stator assembly.

Preferably, the rotor assembly includes a shell, a magnetic plate, and a permanent body. The shell is provided with a second mounting hole and is used for being mounted on a transmission shaft; and the magnetic plate and the permanent magnet are sequentially arranged on the inner side of the shell.

Preferably, the shell is made of an aviation aluminum material.

Preferably, the magnetic plate is an iron plate.

Preferably, the permanent magnet is a neodymium magnet.

Preferably, the shell is provided with a plurality of air guide chutes on the outer side; and all the air guide chutes are circumferentially formed in the outer wall of the shell.

Preferably, the magnetic plate is provided with a plurality of ventilation slots; and all the ventilation slots are formed in the magnetic plate in a circumferentially penetrating manner.

The center disk spindle double-rotor motor provided by the present disclosure at least has the following beneficial effects:

the center disk spindle double-rotor motor includes the transmission shaft, the stator assembly and the rotor assemblies. The stator assembly is arranged on the transmission shaft; the transmission shaft can rotate relative to the stator assembly; the transmission shaft are provided with the rotor assemblies on two sides of the stator assembly; and the rotor assemblies and the transmission shaft synchronously rotate. The whole motor is of a single-stator double-rotor structure, has the advantages of high efficiency, high power, large torque, low loss, light mass and the like in combination with the structural characteristics of the stator and the rotors, is outstanding in heat dissipation effect, and has a wider exploration space.

BRIEF DESCRIPTION OF THE DRAWINGS

To describe the embodiments of the present disclosure or the technical solutions in the existing art more clearly, drawings required to be used in the embodiments or the illustration of the existing art will be briefly introduced below. Obviously, the drawings in the illustration below are only some embodiments of the present disclosure. Those ordinarily skilled in the art also can acquire other drawings according to the provided drawings without doing creative work.

REFERENCE SIGNS IN DRAWINGS

1: stator assembly; 11: stator carrier; 111: through slot; 112: first mounting hole; 12: winding core body; 121: stator iron core; 122: winding group; 131: bearing shell; 132: bearing; 2: rotor assembly; 21: shell; 211: air guide chute; 212: second mounting hole; 22: magnetic plate; 221: ventilation slot; 23: permanent magnet; 3: transmission shaft; 4: fixing flange; 5: heat dissipation assembly; 51: heat conduction pipe; 52: heat dissipation sheet

DESCRIPTION OF THE EMBODIMENTS

In order to make the purposes, technical solutions and advantages of the present disclosure clearer, the technical solutions of the present disclosure will be described in detail below. It is apparent that the described embodiments are a part of the embodiments of the present disclosure, not all the embodiments. Based on the embodiments in the present disclosure, all other embodiments obtained by those of ordinary skill in the art without creative efforts shall fall within the protection scope of the present disclosure.

Figure 1:
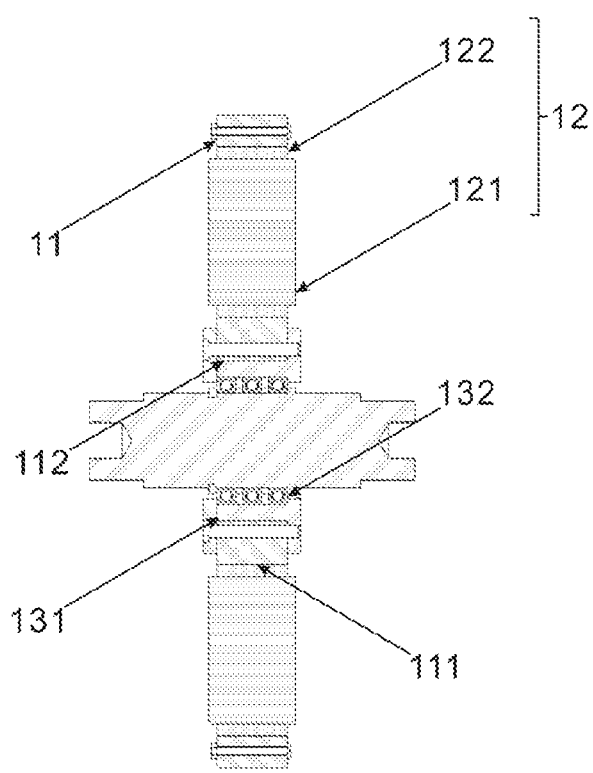
FIG. 1 is a schematic diagram of a mounting state of a stator assembly of the present disclosure.
Figure 2:
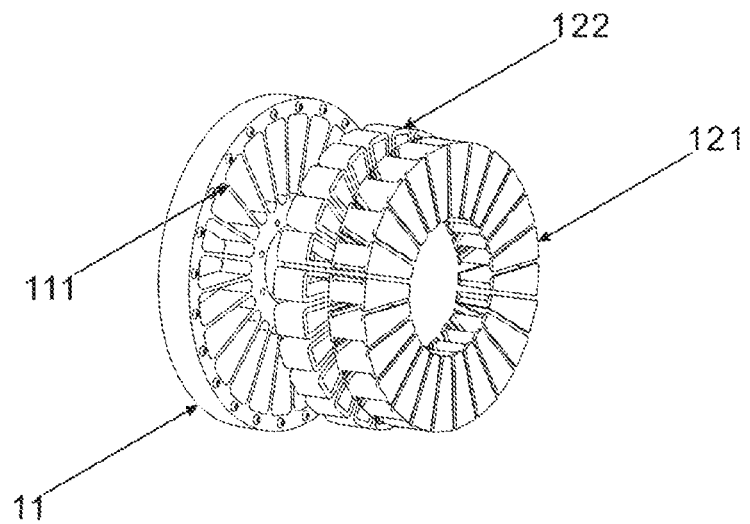
FIG. 2 is a schematic structural diagram of a stator carrier and a winding core body of the present disclosure.

Embodiment 1:

The present disclosure provides a stator assembly 1. As shown in FIG. 1 and FIG. 2, the stator assembly 1 includes a stator carrier 11 and a winding core body 12.

The stator carrier 11 is provided with a first mounting hole 112 in a penetrating manner along an axis of the stator carrier. During mounting, a transmission shaft 3 passes through the first mounting hole 112.

An end surface of the stator carrier 11 is provided with a plurality of through slots 111 in an axially penetrating manner; all the through slots 111 are circumferentially and uniformly disposed relative to the axis of the stator carrier 11; and the winding core body 12 is arranged in the through slot 111.

By means of the through slots 111 that are disposed in the penetrating manner, the stator carrier 11 surrounds the winding core body 12, and a left mechanical port and a right mechanical port are simultaneously formed, so that the motor power and efficiency are improved. The winding core body 12 is completely surrounded, so that non-work copper loss is avoided; and it has the effects of preventing magnetic flux leakage and concentrating magnetic lines, and effectively increases the inductive magnetic force.

As an optional implementation mode, as shown in FIG. 1 and FIG. 2, the winding core body 12 includes a stator core 121 and a winding group 122.

The stator core 121 matches the through slots 111; a groove is annularly formed in the outer wall of the stator core 121 in a circumferential direction; and the winding group 122 is wound on the groove.

The copper space factor of the surrounded winding core body 12 can reach 100%, so that the magnetic flux density is effectively increased, and the motor efficiency is higher. Moreover, the external heat conductivity can be improved, and the heat dissipation effect is further enhanced.

As an optional implementation mode, the winding core body 12 is adhered into the through slots 111 through heat conduction super glue. In a working process, the stator assembly 1 is located at the middle position of the transmission shaft 3, and is provided with rotor assemblies 2 on two sides; permanent magnets corresponding to the two rotor assemblies 2 can generate attracting forces that pull the stator assembly 1; the left and right attracting forces are in a relatively balanced point, so that the stator assembly 1 at the middle position is equivalently in a state without a magnetic attracting force. Therefore, no matter how high the magnetic strength of the permanent magnets is, they do work with the stator assembly 1 at the middle position while exerting minimal mechanical stress on a spindle of the stator assembly 1. By means of glue mounting, there is no need to worry about the falling off problem of the winding core body 12.

As an optional implementation mode, as shown in FIG. 1 and FIG. 2, the stator carrier 11 is formed by stacking non-oriented silicon steel sheets, and a plurality of threaded fasteners are circumferentially disposed at a periphery of the stator carrier 11; the threaded fasteners pass through all the non-oriented silicon steel sheets to fasten all the non-oriented silicon steel sheets; and the rigidity can be effectively improved.

The non-oriented silicon steel sheet is circular so that the whole stator assembly 1 is of a disk structure, a size ratio of the mechanical ports is 1:1; a ratio of magnetic pole to slot poles can be reduced to minimum; the stator assembly has better magnetic potential and electric potential; a torque between tooth slots can be reduced, and a location torque of a motor can be also reduced, so that the magnetic resistance and the rotating torque can be close to a magnetic resistance-free state of a core-free motor; in combination with the winding core body 12 located in the through slots 111, the whole space can be better used; the motor power and the power density are improved, and the motor vibrates less; higher technical requirements can be met; and voltage and current during initiation of the motor are effectively reduced.

The stator core 121 is formed by stacking oriented silicon steel sheets; the oriented silicon steel sheet has lower iron loss and higher magnetic conductivity and magnetic saturation than the non-oriented silicon steel sheet in a rolling direction.

As an optional implementation mode, the winding group 122 is a copper foil winding; the copper foil winding is wound on the stator core 121; an copper foil has lower resistance and no high-frequency skin effect, and has better thermal conductivity through higher current, so that the power, the rotating speed and heat dissipation of the motor are effectively improved.

As an optional implementation mode, as shown in FIG. 1, the stator carrier 11 includes a bearing shell 131 and a bearing 132.

The bearing shell 131 includes an inner shell and a fixed plate; the inner shell includes a barrel body part and a flange part arranged on one side of the barrel body part; and the fixed plate is similar to the flange part in shape. During mounting, the barrel body part is inserted into the first mounting hole 112. The flange part and the fixed plate are respectively located on two sides of the stator carrier 11, and are connected through threaded fasteners.

The bearing 132 matches an inner cavity of the barrel body part, and the bearing 132 is arranged in the barrel body part.

Embodiment 2

Figure 5:
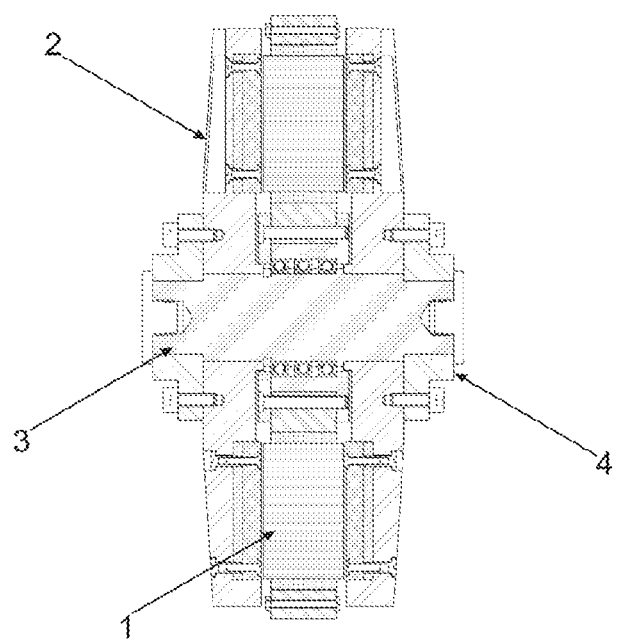
FIG. 5 is a sectional schematic diagram of a structure of Embodiment 2 of the present disclosure.
Figure 6:
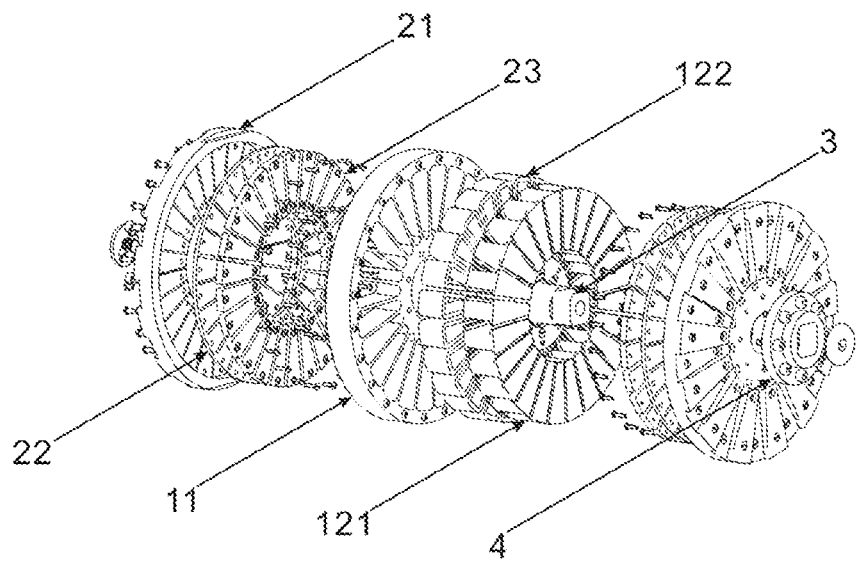
FIG. 6 is an exploded diagram of a structure of Embodiment 2 of the present disclosure.

Embodiment 2 is based on Embodiment 1 and Embodiment 1:

The present disclosure provides a center disk spindle double-rotor motor. As shown in FIG. 5 and FIG. 6, the center disk spindle double-rotor motor includes a transmission shaft 3, a stator assembly 1, and rotor assemblies 2.

The stator assembly 1 is arranged at the middle position of the transmission shaft 3 through a bearing 132; the transmission shaft 3 rotates relative to the stator assembly 1; the transmission shaft 3 is provided with an annular locating flange; one side of the stator assembly 1 presses against the annular locating flange, and the other side of the stator assembly is provided with a stop ring, so that the stator assembly is fixedly firm and hard to loose.

The transmission shaft 3 is provided with the rotor assemblies 2 on two sides of the stator assembly 1; the rotor assemblies 2 are fixedly mounted on the transmission shaft 3 through fixing flanges 4; and the rotor assemblies 2 and the transmission shaft 3 synchronously rotate.

Figure 3:
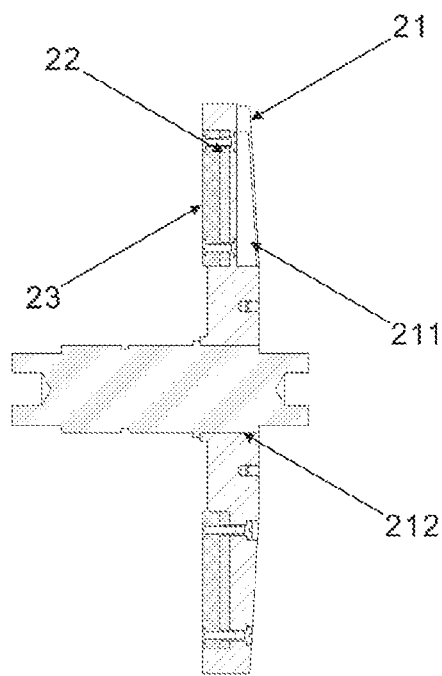
FIG. 3 is a schematic diagram of a mounting state of a rotor assembly of the present disclosure.
Figure 4:
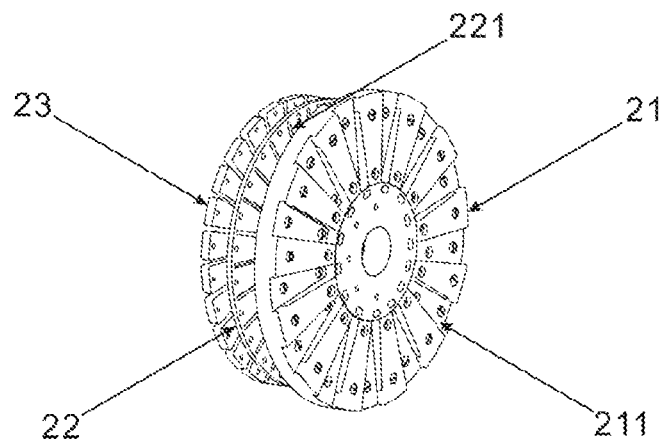
FIG. 4 is a schematic structural diagram of a rotor shell, a magnetic plate and a permanent magnet of the present disclosure.

As an optional implementation mode, as shown in FIG. 3 and FIG. 4, the whole rotor assembly 2 is of a disk structure; the rotor assembly 2 includes a shell 21, a magnetic plate 22, and a plurality of permanent magnets 23; and the shell 21, the magnetic plate 22, and the permanent magnets 23 are connected through threaded fasteners.

The shell 21 is provided with a second mounting hole 212 in a penetrating manner along an axis of the shell. During mounting, a transmission shaft 3 passes through the second mounting hole 212.

The magnetic plate 22 and the permanent magnets 23 are sequentially arranged on the inner side of the shell 21 (sides of the rotor assemblies 2 close to the stator assembly 1 are the inner sides, and sides away from the stator assembly 1 are outer sides). The second mounting hole 212 penetrate through the magnetic plate 22. A plurality of permanent magnets 23 are provided. All the permanent magnets 23 are circumferentially and uniformly disposed relative to the axis of the shell 21.

As an optional implementation mode, the shell 21 is made of an aviation aluminum material that is relatively high in strength good, good in corrosion resistance, and good in machinability and heat dissipation effect.

The magnetic plate 22 is an iron plate used for a magnetic loop of a magnet, and can achieve effects of preventing magnetic flux leakage and concentrating magnetic lines and effectively enhance the magnetic intensity of the magnet.

The permanent 23 is a neodymium magnet. The neodymium magnet has extremely high magnetic energy product and coercive force, high performance-price ratio, and good mechanical characteristics.

As an optional implementation mode, as shown in FIG. 4, a plurality of air guide chutes 211 are formed in the outer side of the shell 21; and all the air guide chutes 211 are circumferentially and uniformly formed in the outer wall of the shell 21.

The magnetic plate 22 is provided with a plurality of ventilation slots 221, and the ventilation slots 221 are strip-type slots; and all the ventilation slots 221 are circumferentially and uniformly formed in the magnetic plate 22 in a penetrating manner.

When the rotor assemblies 2 rotate, ventilation for heat dissipation is performed through the air guide chutes 211 and the ventilation slots 221, so that the long-time load capability of the motor can be effectively improved, the heat dissipation effect is outstanding, and the problem of easy demagnetization caused by the factor that the motor has extremely high temperature and is overheated can be effectively avoided.

Embodiment 3

Figure 7:
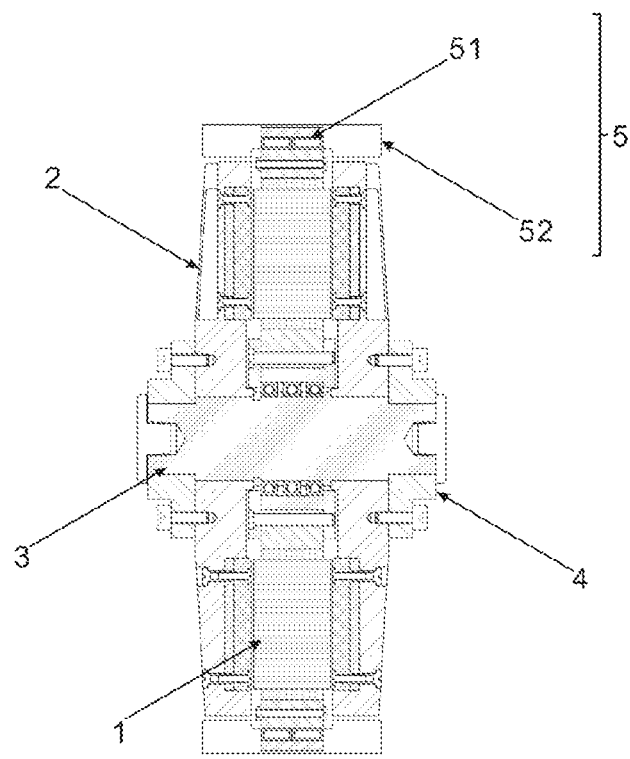
FIG. 7 is a sectional schematic diagram of a structure of Embodiment 3 of the present disclosure.
Figure 8:
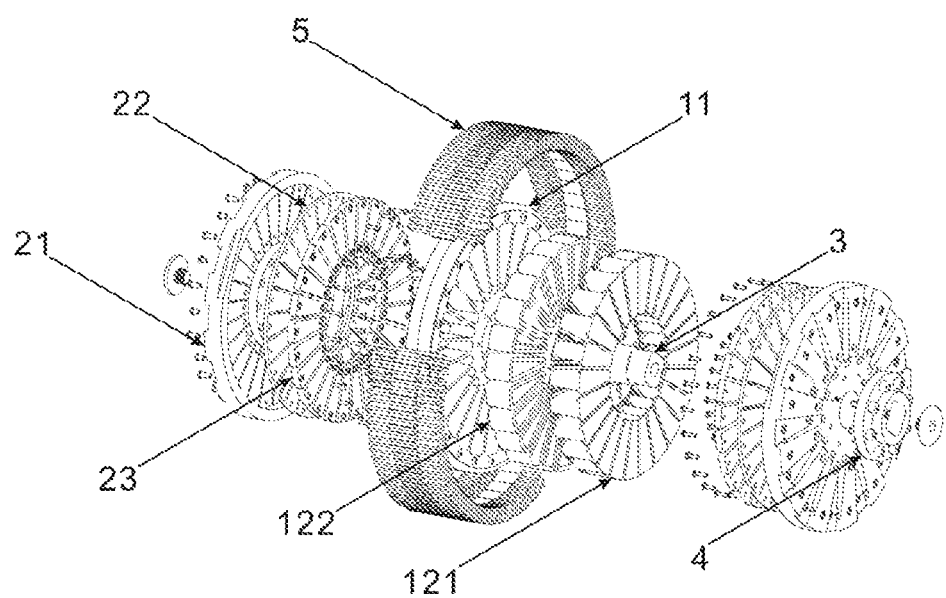
FIG. 8 is an exploded diagram of a structure of Embodiment 3 of the present disclosure.

A difference between Embodiment 3 and Embodiment 2 is that as shown in FIG. 7 and FIG. 8, the center disk spindle double-rotor motor includes a heat dissipation assembly 5. The heat dissipation assembly 5 includes a heat conduction pipe 51 and a heat dissipation sheet 52.

The heat conduction pipe 51 is a heat conduction copper pipe, and the heat conduction copper pipe is annularly disposed on the outer side of the stator assembly 1.

The heat dissipation sheet 52 is circumferentially disposed relative to the stator assembly 1.

As shown in FIG. 7, the heat dissipation sheet 52 is formed by abutting and mounting two heat dissipation pieces; the heat dissipation piece includes an internal mounting ring and a sheet-like piece circumferentially and uniformly arranged in the outer side of the mounting ring; the sheet-like piece can enlarge the heat exchange area and enhance the heat dissipation effect; sides of the mounting rings close to the stator assembly 1 are provided with trenches; and the heat dissipation sheet 52 is wrapped on the heat conduction pipe 51 through the trenches.

By means of mutual cooperation of the heat conduction pipe 51 and the heat dissipation sheet 52, liquid cooling and air cooling are combined, so that the heat dissipation effect of the motor is outstanding.

The above is only specific implementation modes of the disclosure, but the protection scope of the disclosure is not limited to this. Any person skilled in the art can easily think of changes or replacements within the technical scope disclosed by the disclosure. The changes or replacements should be covered by the protection scope of the disclosure. Therefore, the protection scope of the present invention should be subject to the protection scope of the claims.

What is claimed is:

1. A center disk spindle double-rotor motor, comprising:
a transmission shaft;
a pair of rotor assemblies, wherein each rotor assembly comprises:
a shell;
a magnetic plate; and
a plurality of permanent magnets, wherein the magnetic plate and the permanent magnets are housed within the shell; and
a stator assembly, wherein the stator assembly further comprises:
a stator carrier, wherein the stator carrier is provided with a first mounting hole for the stator carrier to be mounted on the transmission shaft; and
a winding core body, wherein the winding core body comprises:
a stator core; and
a winding group, wherein the stator core and the winding group are housed within the winding core body, which in turn is housed in the stator carrier thereby forming a closed group with the stator carrier completely surrounding the winding group;
wherein the stator assembly is arranged on the transmission shaft and the transmission shaft rotates relative to the stator assembly;
wherein the transmission shaft is provided with the rotor assemblies on two sides of the stator assembly and the rotor assemblies and the transmission shaft synchronously rotate.

2. The center disk spindle double-rotor motor according to claim 1, wherein the center disk spindle double-rotor motor comprises a heat dissipation assembly; the heat dissipation assembly comprises a heat conduction pipe and heat dissipation sheets, wherein
the heat conduction pipe is annularly arranged on the stator assembly; and
all the heat dissipation sheets are circumferentially disposed relative to the stator assembly.

3. The center disk spindle double-rotor motor according to claim 1, wherein
the shell is provided with a second mounting hole and is used for being mounted on a transmission shaft; and
the magnetic plate and the permanent magnet are sequentially arranged on the inner side of the shell.

4. The center disk spindle double-rotor motor according to claim 3, wherein the magnetic plate is an iron plate.

5. The center disk spindle double-rotor motor according to claim 3, wherein the permanent magnet is a neodymium magnet.

6. The center disk spindle double-rotor motor according to claim 3, wherein the shell is provided with a plurality of air guide chutes on the outer side; and all the air guide chutes are circumferentially formed in the outer wall of the shell.

7. The center disk spindle double-rotor motor according to claim 3, wherein the magnetic plate is provided with a plurality of ventilation slots; and all the ventilation slots are formed in the magnetic plate in a circumferentially penetrating manner.

8. The center disk spindle double-rotor motor according to claim 1, wherein the shell is made of an aviation aluminum material.

* * * * *